T. R. WATSON.
BOX STRAPPING MACHINE.
APPLICATION FILED MAY 1, 1917.
1,265,560.
Patented May 7, 1918.
4 SHEETS—SHEET 1.
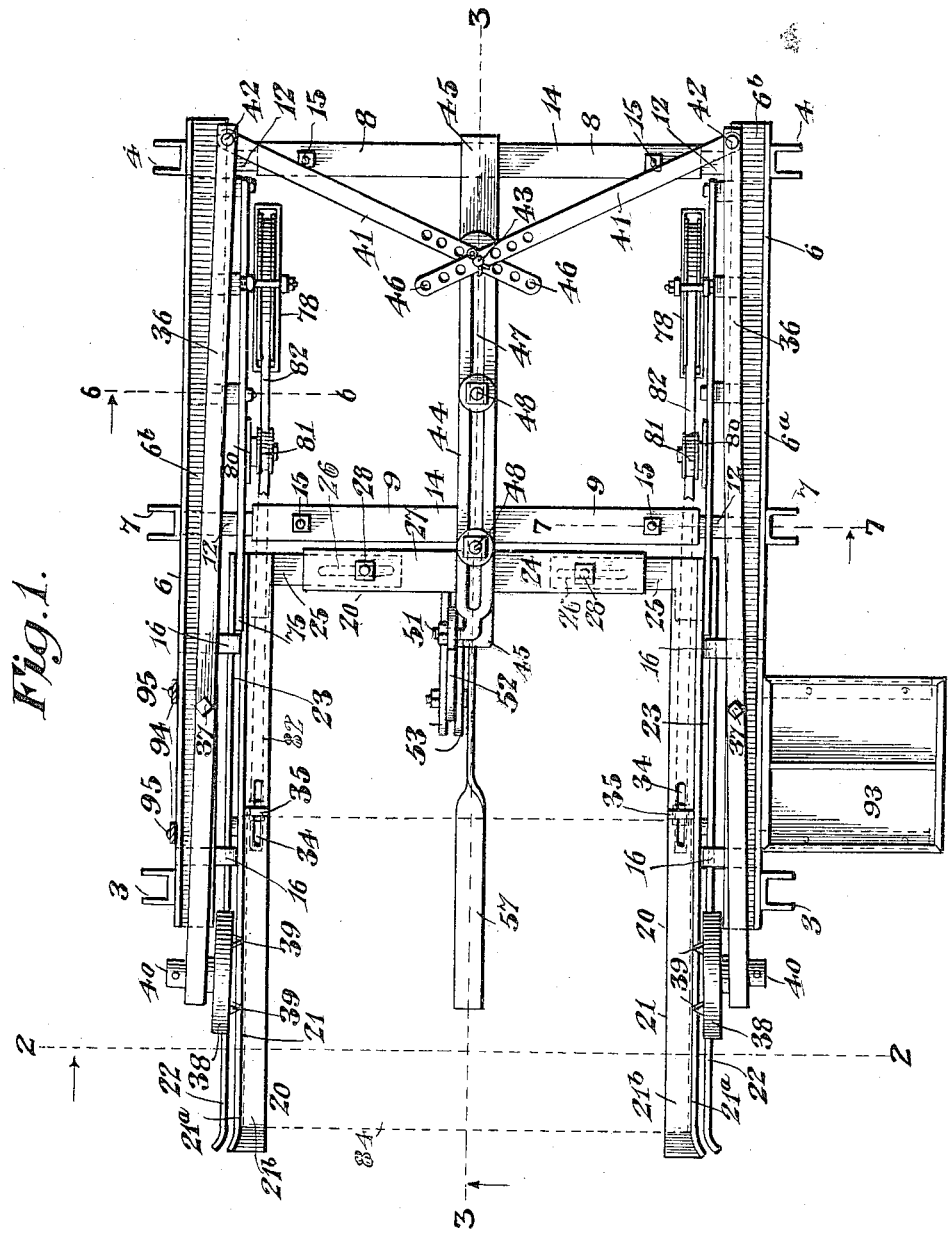
WITNESSES
Jas. K. McCathran
Chas. H. Kesler
Thomas R. Watson, INVENTOR
BY C. G. Biggers
ATTORNEY

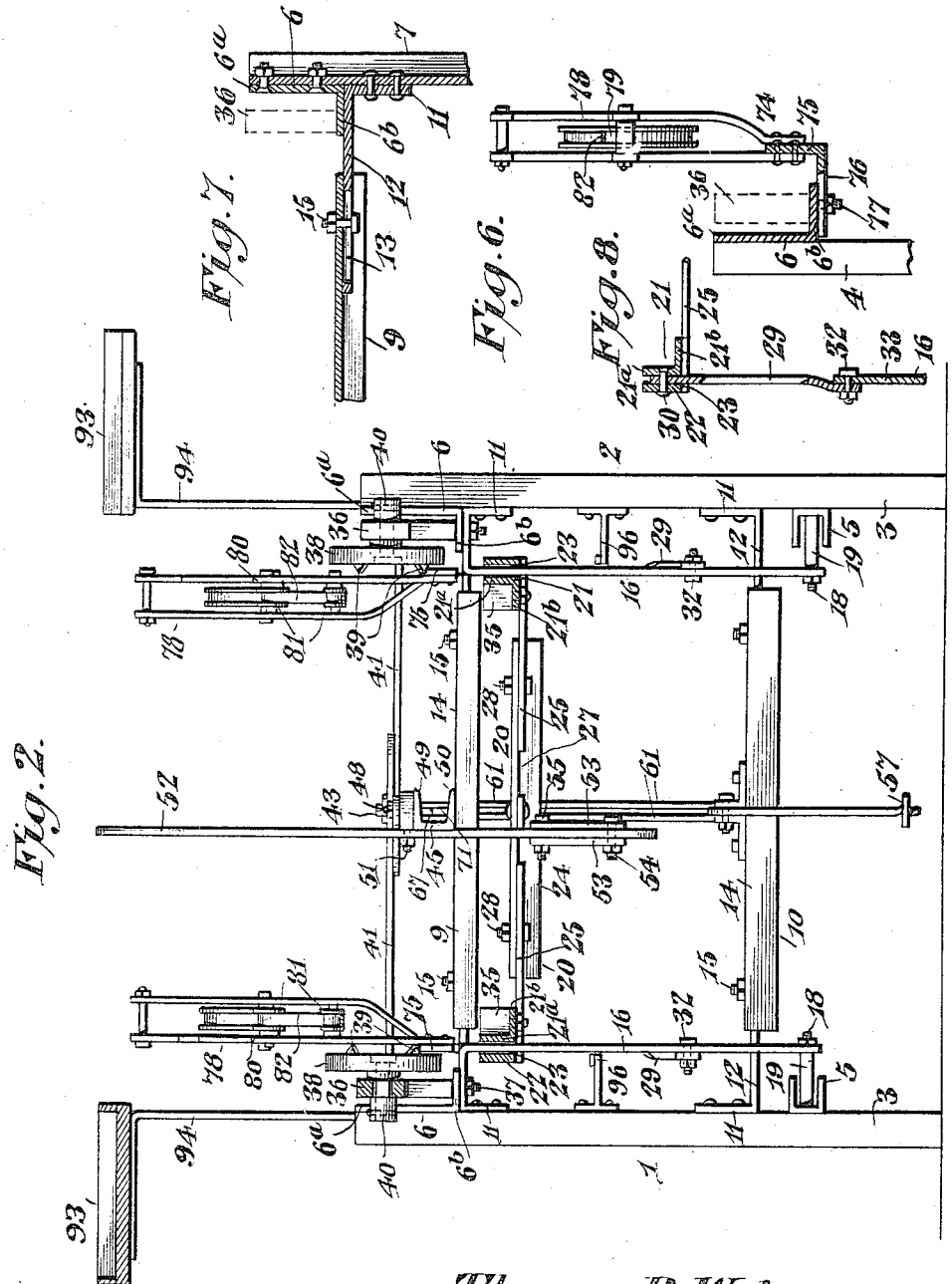

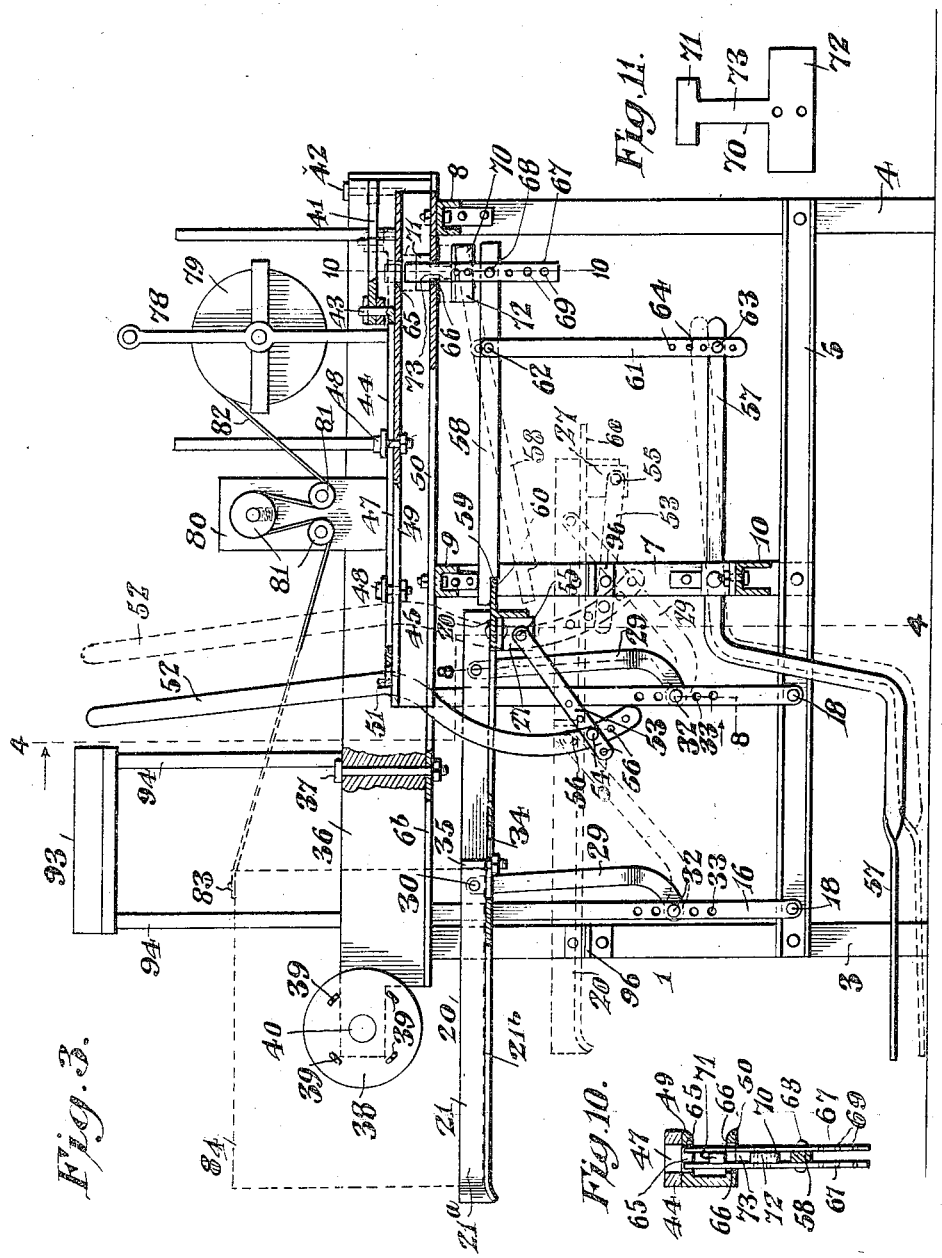

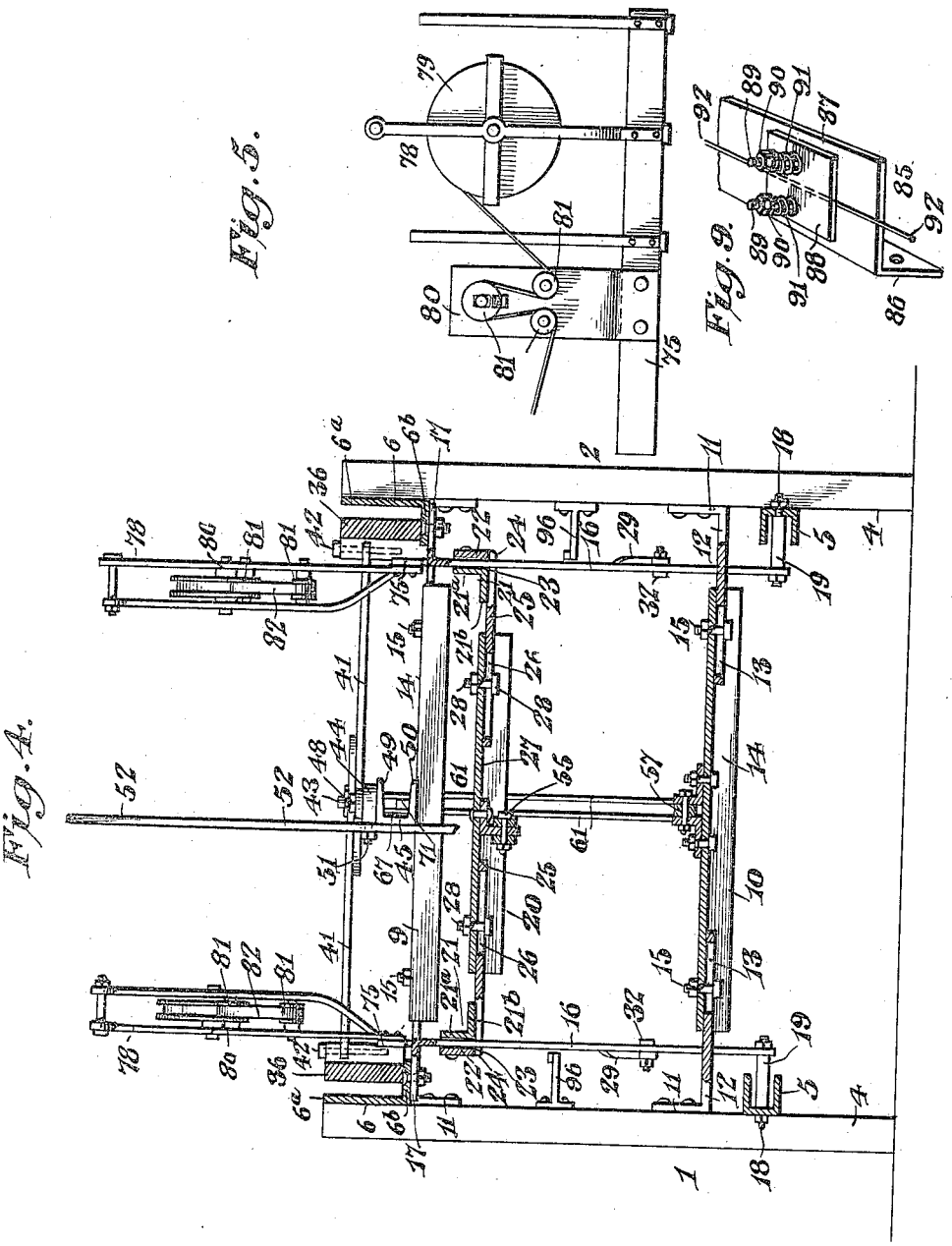

UNITED STATES PATENT OFFICE.

THOMAS R. WATSON, OF MONTEREY, CALIFORNIA.

BOX-STRAPPING MACHINE.

1,265,560.   Specification of Letters Patent.   Patented May 7, 1918.

Application filed May 1, 1917. Serial No. 165,713.

*To all whom it may concern:*

Be it known that I, THOMAS R. WATSON, a citizen of the United States, residing at Monterey, in the county of Monterey and State of California, have invented a new and useful Box-Strapping Machine, of which the following is a specification.

This invention relates to strapping machines for binding boxes or packing cases at uniform distances from their ends with straps, wire or the like.

An object of the invention is to provide a construction which can be adjusted to boxes of different sizes, and in which the box can be easily and quickly placed in position, clamped, rotated to bind the same with the wire or straps, and released.

In carrying out this invention, I provide a construction comprising a table or box support on which a box is placed in position and clamped between arms, said arms being moved into engagement with the box through the instrumentality of a lever or other actuating device, after which the table is then lowered out of the way to allow the rotation of the box while it is being strapped, and finally the table is raised after the binding or strapping operation has been completed.

In the accompanying drawings I have illustrated one embodiment of my invention, in which:

Figure 1 is a plan view.

Fig. 2 is a transverse sectional elevation on the line 2—2 of Fig. 1, looking in the direction of the arrow.

Fig. 3 is a longitudinal sectional elevation on the line 3—3 of Fig. 1, looking in the direction of the arrow.

Fig. 4 is a transverse sectional elevation on the line 4—4 of Fig. 3, looking in the direction of the arrow.

Fig. 5 is a detail side view of one of the strap rolls and tensioning devices, with the support therefor.

Fig. 6 is a detail sectional view on the line 6—6 of Fig. 1, looking in the direction of the arrow.

Fig. 7 is a detail sectional view on the line 7—7 of Fig. 1, looking in the direction of the arrow.

Fig. 8 is a detail sectional view on the line 8—8 of Fig. 3, looking in the direction of the arrow.

Fig. 9 is a detail perspective view of a modified form of tensioning device.

Fig. 10 is a detail sectional view on the line 10—10 of Fig. 3.

Fig. 11 is a detail of a stop and hanger.

As here illustrated, the machine has side frames 1 and 2, each of which comprises legs or supporting posts 3 and 4 of channel iron, a longitudinally extending lower member or channel iron 5 attached to the inner side of the legs 3 and 4, and an upper longitudinally extending member or angle iron 6 having a vertical flange $6^a$ attached to the inside of the legs 3 and 4 at the upper ends thereof, and a lower inwardly extending horizontal flange $6^b$. Each frame is reinforced by means of vertical channel irons 7 which are interposed between the legs 3 and 4 and are attached at their ends to the members 5 and 6.

The side frames 1 and 2 are connected and braced by transversely extending members 8 and 9 connecting the upper ends of the legs 4 and channel irons 7, and a transversely extending member 10 connecting the lower ends of the channel irons 7. Each of these members 8, 9 and 10 are adjustable in length in order to vary the distance between the frames 1 and 2 to accommodate the latter to boxes or cases of different lengths or sizes. For this purpose each member, see for instance, the member 10 in Fig. 4, comprises angle bars 11 attached to the adjacent vertical members of the frame at each side, and having horizontal portions 12 extending inwardly toward each other and provided with slots 13. Channel irons 14 embrace the inner ends of the horizontally extending portions 12 of the angle bars 11. Bolts 15 are provided upon these channel irons 14 and project through and ride in the slots 13 of the portions 12, whereby the width of the frame members 1 and 2 may be adjusted as desired, and the channel irons 14 adjustably clamped to the portions 12.

Spaced inwardly from the frames 1 and 2, and connected thereto, are vertically extending uprights 16 having outwardly turned upper ends 17 attached to the bottoms of the horizontal flanges of the upper longitudinally extending members 6, and connected at their lower ends to the longitudinally extending lower members 5 by means of the bolts 18. The lower ends of the uprights 16 are spaced from the frames by means of the sleeves 19 encircling the bolts 18 and interposed between the uprights and the frame. In the form herein illustrated there are two uprights at each side arranged at the front ends of the frames.

The uprights 16 constitute guiding and supporting means for a table or box support 20. This table comprises longitudinally extending angle irons 21 having vertical flanges 21$^a$, in engagement with the inner sides of the uprights 16, and lower horizontal inwardly extending flanges 21$^b$ constituting supporting ledges for the box or packing case. Strips 22 are arranged upon the outside of the uprights and connected to the vertical flanges 21$^a$, providing a space or slot 23 therebetween. The rear ends of the angle irons 21 are connected by a transverse member 24 comprising inwardly extending plates 25 provided with slots 26. The inner ends of the plates 25 are connected by an angle iron 27 provided with bolts 28 riding in the slots 26, whereby the distance between the angle irons 21 may be varied or adjusted in accordance with the adjustment of the frames 1 and 2. This provides an adjustable table or box support. Vertically arranged links 29 are pivotally connected at their upper ends 30 to the table 20 between the flanges 21$^a$ and the strips 22. The lower ends of the links are bent forwardly, as shown in Fig. 3 and laterally, as shown in Fig. 4, and pivotally attached at 32 to the outside of the uprights 16. These uprights are provided with a plurality of openings 33, whereby the pivotal connection 32 may be adjusted upwardly or downwardly to vary the height of the table. By the above construction there has been provided a table which normally tends to move rearwardly and downwardly and which is guided by the uprights 16, the said links constituting parallel motion means for mounting the box support.

The horizontal flanges 21$^b$ of the angle irons 21 are provided with longitudinal slots 34, in which is adjustably mounted a pair of vertically extending transverse stops 35, against which the box may be pushed when placed in position upon the table. The distance between the stops and the front of the table can be varied according to the size of the box. The table 20 is maintained in raised position, as shown in Fig. 3, by suitable latch mechanism which will be described more fully hereinafter.

A pair of longitudinally extending arms 36 are pivotally mounted intermediate their ends at 37 to the flanges 6$^b$ of the longitudinally extending frame members 6. Disks 38 or clamping devices provided with inwardly projecting teeth 39 are loosely and rotatably mounted see Fig. 2 at the forward ends of the arms in suitable journal bearings 40 and are adapted to be moved toward each other to engage the ends of the box when the arms 36 swing around the pivots 37 as axes. The disks being loose within their bearings will squarely engage the ends of the box.

For actuating or swinging the arms 36, a pair of transversely extending links 41 are pivotally connected at their outer ends 42 to the rear ends of the arms 36. The inner ends of the links are pivotally connected to a pin 43 fixed to a longitudinal slide 44 slidably mounted upon a longitudinal channel member 45 resting upon the transverse members 8 and 9. The inner ends of the links are provided with a plurality of openings 46, whereby they may be adjustably attached to the pin 43 in accordance with the adjustments of the frames 1 and 2. The slide 44 is provided with a longitudinally extending slot 47 through which guiding bolts 48 fixed to the channel member 45 project, whereby the slide is retained in engagement with the channel member and reciprocates in line therewith at all times. The links 41 constitute in fact a toggle, which when the slide 44 is moved to the rear, straightens out, separating the rear ends of the arms 36 and causing the disks 38 to move toward each other. The channel member 45 comprises upper and lower horizontal flanges 49 and 50 upon the upper of which the slide 44 reciprocates.

At the forward end of the slide 44 is a laterally projecting pin 51, to which an actuating lever 52 is pivotally attached intermediate its ends. The lever 52 extends below and in front of the transverse member 24 of the table. A double link 53 is pivotally connected at one end 54 to the lower end of the lever, and at its opposite end 55 to the transverse member 24 of the table, as shown in Fig. 3. The lower end of the lever and the end 54 of the link are provided with a plurality of openings 56, whereby the relative throw of the link and lever may be adjusted in accordance with the vertical adjustment of the table and other conditions.

In order to hold the table 20 in raised position, or allow it to swing downwardly and backwardly out of the way, and in order to lock the slide 44 in rearward position so that the box will be retained clamped between the disks, I have provided a foot lever 57 Fig. 3 which extends from a convenient position at the front of the machine rearwardly and is pivoted intermediate its ends, to the lower transversely extending member 10. A longitudinally extending latch 58, provided at the lower side of its forward end with a notch 59, which engages a ledge 60 upon the transversely extending member 24 of the table, retains the table in raised position. A double link 61 is pivotally connected at its upper end 62 to the latch 58 at a point nearer the rear end thereof than the forward end, whereby the forward end of the latch tends to move downwardly under the influence of gravity around the end 62 as an axis, so that it can be easily retained in position against the ledge 60. The lower end of the link 61 is pivotally connected at 63 to the rear end of the foot lever 57 and is provided with a plurality of extra openings 64, whereby the distance between the latch 58 and the foot lever 57 can be adjusted in accordance with the vertical adjustment of the table.

The horizontal flanges 49 and 50 of the channel member 45 at the rear thereof are provided with alined openings 65 and 66 see Figs. 3 and 10, with which the slot 47 of the slide 44 alines when the toggle is in straightened position with the disks 38 in clamping engagement with the ends of the box. Slidably mounted within the openings 65 and 66 is a detent 67 adapted to be moved into the slot 47 of the actuating slide 44 and retain the slide in its rear position. The lower end of the detent 67 is pivotally connected at 68 to the rear end of the latch 58. The detent 67 is provided with a plurality of openings 69, so that the latch 58 may be adjusted vertically with the vertical adjustment of the table 20.

It will be seen that the engagement of the detent 67 with the flanges 49 and 50 prevents the table 20, by reason of its weight, from pushing the latch 58 rearwardly and thereby becoming disengaged. The detent 67 is actuated by the foot lever 57 as will be more fully explained.

Fixed to the detent 67 is a plate 70 see Fig. 11 constituting a combined hanger and abutment for limiting the upward or downward movement of the detent. The plate 70 is fixed to the intermediate portion of the detent, and comprises an enlarged upper end 71 between the flanges 49 and 50, a much larger lower end 72 below the flange 50 and a reduced intermediate portion 73 connecting the enlarged portions or ends and sliding in the lower opening 66. The upper opening 65 is large enough to allow the detent 67 to slide therethrough to engage the slide 44. The ends 71 and 72 will engage the flanges to limit the upward movement while the end 71 will engage the lower flange to limit the downward movement of the detent.

Brackets 74, see Figs. 5 and 6, comprise longitudinally extending vertical portions 75 and transversely extending horizontal portions 76 attached to the horizontal flanges of the members 6 adjacent to their rear ends, by means of the bolts 77. These brackets are spaced inwardly from the members 6 and have attached to the portions 75 the supporting frames 78 in which are journaled the rolls 79 of binding material, such as strapping or wire. Attached to the brackets 74 in front of the rolls 79 are suitable tensioning devices 80 through which the strapping or wire pass. In the construction shown in Fig. 5, these tensioning devices comprise a plurality of rollers 81, one of which is adjustable substantially as shown for the purpose of varying the tension. In Fig. 3 the strapping or wire is indicated at 82, and it will be seen that the rolls 79 and tensioning devices 80 are so arranged that the binding material can be attached at 83 to the box, indicated by the dotted lines 84 in Fig. 3 and fed forwardly, when the box is rotated, under tension and without twisting or distorting the same.

In lieu of the tensioning devices 80 shown in Fig. 5, that illustrated in Fig. 9 may be used. The tensioning device shown in Fig. 9 comprises an angle iron 85 having a flange 86 which can be attached in any suitable manner to the frame or portion 75 and a clamping flange 87. A coöperating plate 88 is slidably mounted upon bolts 89 which are fastened to the flange 87 of the angle iron 85. The outer ends of the bolts are provided with adjustable heads 90 between which and the plate 88 are interposed springs 91 whereby the wire 92 is closely engaged and tensioned. Nail boxes 93 having vertical uprights 94 may be attached to the outside of the members 6, as clearly shown at 95 in Fig. 1.

When the box is to be rotated to bind the same, the hand lever 52 is moved to the rear from the position shown in full lines, Fig. 3, to that shown in dotted lines, causing the links 41 to straighten out and moving the disks 38 into engagement with the ends of the box. The lever swings around the pivots 54 and 55 and is supported by the links 53 during this operation. When the lever is in position to cause the disks to engage the box, the foot lever 57 is depressed, which causes the detent 67 to move into the path of the slide 44, after which the lever 52 can be released, as the detent 67 will then hold the disks 38 in engagement with the ends of the box. When the enlarged end 72 abuts the bottom flange of the channel member 45, the detent will not move farther, and a continued movement of the foot lever will cause the forward end of the latch 58 to move upwardly out of engagement with the supporting table, which will then swing downwardly and rearwardly out of the way. The foot lever can then be released, and it should be noticed that the forward end of the latch 58 will then swing downwardly around the upper end 62 of the link as an axis, and will retain by reason of its weight, the detent 67 in raised or locking position.

Suitable stops 96 prevent the table from falling too far and also take up the shock of the fall.

It will be seen that I have provided a construction in which the box can be easily placed in position upon the table 20, and then securely clamped by means of a single pull upon the hand lever 52, after which the support for the box or table may be lowered out of the way by a foot lever which does not require the use of the hands. The box can then be spun or rotated by hand by reason of the loose rotatable mounting of the disks 38, and thereby causing the straps or wire to be wound about the ends of the box, the straps or wire being at all times held taut by means of the tensioning devices, whereby danger of the same becoming caught in various portions of the machine and improperly winding about the boxes will be prevented. After the winding operation, the strapping may be secured to the box by nails from the convenient nail boxes.

To raise the table 20 and release the box, the upper end of the lever 52 is pushed farther rearwardly from the position shown in dotted lines, Fig. 3, around its pivotal connection 51 with the slide 45 as an axis, whereby the lower end of the lever will swing forwardly, causing the supporting table 20 to move upwardly and forwardly into raised position against the underside of the box. At the same time the forward end of the latch 58 which retains the supporting table in raised position will also be raised by the table.

The forward end of the latch 58 swings upwardly around the end 62 as an axis, and the notch 59 engages the ledge 60 holding the table 20 in raised position. At the same time, as the rear end of the latch swings downwardly, the detent 67 will be moved out of engagement with the slide 45.

By pulling the lever 52 forwardly to the position shown in full lines, Fig. 3, the disks 38 will disengage the box, allowing the box to rest upon the table from which it can be easily removed. The foot lever 57 may be depressed to retain the detent 67 in raised position until the table is raised and locked by the latch. The operator by holding the lever 52 can prevent the disengagement of the box from the disks until the table 20 is raised and locked.

While I have shown and described one embodiment of my invention, it is to be understood that I do not desire to be limited to the details of construction herein shown and described, for obvious modifications will be apparent to any one skilled in the art.

What is claimed is:—

1. The combination with a frame, of an arm pivotally mounted for lateral swinging movement at each side of said frame, rotatable clamping devices journaled in the forward ends of said arms and adapted to engage each end of a box, means for actuating said arms to move the devices into engagement with said box, and means for locking said arms in their engaged position.

2. The combination with a frame, of a vertically movable box support, rotatable clamping devices at each side of the frame adapted to be moved into engagement with the ends of the box, a hand lever for moving said clamping devices into engagement with the ends of the box, and means for locking the clamping devices in their engaged position on movement of the box support.

3. The combination with a frame, of arms pivoted to said frame, clamping devices rotatably mounted upon said arms, a toggle connecting said arms, means for actuating said toggle to cause said clamping devices to engage the ends of a box, means for supporting a box, means for locking said clamping devices in their engaged position, and means for feeding binding material to said box when rotated.

4. The combination with a movable box support, of rotatable devices for engaging the box and permitting its rotation by hand, means for controlling said box support to move the same away from the box, means for locking the devices when engaged with a box on movement of the box support, and feeding devices for binding material adapted to be wound around said box when it is rotated.

5. The combination with a frame and a movable box support, clamping devices at each side of the frame for clamping the ends of a box, means for moving said box support out of the way of the box to permit the rotation of the latter, means for locking the devices when engaged with a box on movement of the support, and means for feeding binding material to the box as it is rotated.

6. The combination with a frame, of a pair of arms pivoted to said frame, clamping devices adapted to engage a box and rotatably mounted on the arms at the forward ends thereof, a box support mounted below said arms and devices and adapted to be moved upwardly to support the box and to be moved downwardly out of the way of the box to permit its rotation, means for actuating said arms to cause the said devices to engage the ends of the box, and means for locking the devices when engaged with the box on movement of the box support.

7. The combination with a frame, of a movable box support, clamping devices for engaging the box, means for mounting and operating said box support to move the same away from the box, means for locking the box support when in position to engage the box, and means for locking said clamping devices in their engaged position upon the movement of the box support to its inactive position.

8. The combination with a frame, of a movable box support, clamping devices for engaging the box, means for mounting and operating said box support to move the same toward and away from the box, and means for locking said clamping devices in their engaged position, said locking means being released after the movement of the box support to its active position.

9. The combination with a frame, of a movable box support, clamping devices for engaging the box, means for mounting said box support so as to allow movement of the same toward and away from the box, means for locking said clamping devices, and means for raising said box support and locking the same in its raised position, said clamping devices being retained in their locked relation until the box support is fully raised and locked.

10. The combination with a frame, of a movable box support, clamping devices for engaging the box, means for mounting and operating said box support to move the same toward and away from the box, a latch for holding the box support in its active position, and detent means for locking the clamping devices, said detent means and latch being connected whereby upon the withdrawal of the latch from the box support, the detent means is thrown into engagement.

11. The combination with a frame of clamping devices for engaging a box, a movable box support, means for mounting and operating said box support to move the same toward and away from the box, a latch for holding the box support in its active position, detent means connected to the latch for locking the clamping devices, a lever connected to and controlling the latch and detent.

12. The combination with a frame, of a movable box support, clamping devices, a hand lever for operating the clamping devices to move them into and out of engagement with the box, detent means for locking said clamping devices in engagement with the box, and a foot-operated lever for moving the detent means into and out of engagement.

13. The combination with a frame, of a movable box support, clamping devices for engaging the box, means for mounting said box support so as to permit the movement of the same toward and from the box, means for moving the clamping devices into and out of engagement with the box, locking means for retaining said clamping devices in engagement with the box, a latch for holding the box support in its active position, and a foot lever connected with the latch and the locking means for the clamping devices, whereby the locking means is first actuated to lock the clamping devices and then to release the latch from the box support.

14. The combination with a frame, of a box support movably mounted upon said frame and adapted to support a box, clamping devices at each side of the frame, a hand lever for moving said clamping devices into and out of engagement with the ends of the box, means for mounting the box support so as to permit the movement of the same toward and away from the box, a latch for holding the box support in its active position, and a foot lever for controlling said latch, said hand lever being connected with the box support for moving the same.

15. The combination with a frame, of a movable box support, clamping devices for engaging the box, means for mounting said box support so as to permit the movement of the same toward and away from the box, a latch for retaining the box support in its active position, locking means for retaining the clamping devices in engagement with the box, and means for controlling the latch for the box support and said locking means, whereby when the box support is held by the latch in its raised position, the locking means is released, and when the latch for the box support is in its inoperative position, said locking means is in its engaged position.

16. The combination with a frame, of a movable box support, clamping devices for engaging the box, means for mounting said box support so as to permit the movement of the same in a downward and rearward direction, means for operating said box support, a latch for engaging said box support to retain the same in its active position, a detent connected with the latch for locking the clamping devices in their engaged position, means for operating said latch and said detent, and means for guiding the movement of said detent, whereby the detent serves to hold the latch in engagement with the box support.

17. The combination with a frame, of a movable box support, clamping devices, means for moving said clamping devices into and out of engagement with the box, detent means for locking said clamping devices in engagement with the box, means for mounting said box support so as to be movable in a downward and rearward direction away from the box, a latch for holding the box support in its active position, and a foot operated lever controlling said latch and said detent, said detent means being retained in its locked position by the weight of the latch when the latter is in its inoperative position.

18. The combination with a frame, of a pair of arms mounted at each side of the frame and pivoted by a vertical pivot to swing in a horizontal plane, clamping devices provided at one end of the arms, toggle links connected to the other end of the arms, a slide pivotally connected to the links for moving the same, a guide on the frame for said slide, and means for operating the slide.

19. The combination with a frame, of a pair of arms mounted at each side of the frame and pivoted by a vertical pivot to swing in a horizontal plane, clamping devices provided at one end of the arms, toggle links connected to the other end of the arms, a longitudinally slotted slide, a guide on the frame for said slide, means for pivotally connecting the links to the slide, means for operating the slide, and a detent with means to project the same into the slot of the slide to lock the links and hold the arms with their clamping devices engaged with the box.

20. The combination with a frame having at each side an upper longitudinally extending member in the form of an angle iron provided with an inwardly projecting bottom flange, of a pair of arms, one at each side, formed of flat material, set vertically edgewise and resting upon said flange, a vertical pivot for pivoting one of said arms to each of said members, so as to cause said arms to swing in a horizontal plane, clamping devices provided at one end of the arms, toggle links connected to the other end of said arms, means for moving said toggle links to swing the arms and cause the clamping devices to approach and recede from the box, and means for locking the said means so as to retain the clamping devices in clamped relation.

21. The combination with a frame, of a movable box support, arms at each side of the box support, clamping devices for engaging the box mounted on said arms, toggle links connected to said arms for moving the same, a slide to which the toggle links are pivotally connected, means for operating the slide and for guiding the movement of the same, and a detent movable into engagement with the slide.

22. The combination with a frame, of clamping devices for engaging a box, a movable box support, means for mounting said box support to allow the same to be moved toward and away from the box in a downward and rearward direction, a lever for operating the clamping devices, and a connection between said lever and said box support for moving the latter.

23. The combination with a frame, of clamping devices for engaging a box, a movable box support, means for mounting said box support to move in a downward and rearward direction away from the box, and a lever for raising the box support and releasing the clamping devices from the box.

24. The combination with a frame, of a movable box support, clamping devices for engaging the box, means for mounting and operating said box support to move the same toward and away from the box, a latch to retain the box support in its raised position, and a foot-operated lever for said latch.

25. The combination with a frame having clamping devices at each side thereof adapted to be moved into engagement with the ends of a box, of a box support below said clamping devices and movable away from the box, means for latching the said box support in its active position, a hand lever for actuating said clamping devices to cause the same to engage the ends of the box, a connection between said lever and the box support for raising the latter into active position, and a foot-operated lever for said latching means.

26. The combination with a frame, of clamping devices for engaging the ends of a box, a support for the box, parallel motion means for mounting the box support below said devices, means for moving the box support downwardly and rearwardly toward and from the bottom of the box, and a latch for engaging the box support to hold the same in its active position.

27. The combination with a frame, of clamping devices for engaging the ends of a box, a support for the box, means on the frame for guiding the movement of the box support, and a lever and links connected to the box support to cause the latter to move downwardly and rearwardly toward and from the bottom of the box.

28. The combination with a frame, of clamping devices for engaging the ends of a box, a support for the box, a pair of uprights connected to the frame at each side for guiding the movement of the box support, a pair of links at each side connected to the uprights and to the box support, a hand lever, and a link connecting the said lever to the box support for causing the latter to move rearwardly and downwardly toward and from the box.

29. The combination with a frame, of clamping devices for engaging a box, a movable box support, means for mounting said box support so as to be capable of movement toward and from the box in a downward and rearward direction, means for moving the box support, a gravity latch for engaging the box support to hold the same in its active position, and a lever connected to the latch for withdrawing the same from engagement with the box support, said latch when in its inoperative position extending over the box support in the path of movement of the latter, whereby the box support on movement to its raised position engages the latch and throws the same into latching position.

30. The combination with a frame, of a movable box support, clamping devices for engaging the box, said box support being formed with angle iron sides which form guides for the box, and adjustable stops providing abutments for the box, and means for mounting and operating said box support to move the same toward and from the box.

31. The combination with a frame, of rotatable clamping devices adjustably mounted upon said frame and adapted to be moved into engagement with the ends of a box, a box support having links connecting the same to the frame, said links being pivotally connected at their upper ends to the box support and having forwardly directed lower ends pivotally connected to the frame whereby the support tends normally to move rearwardly and downwardly, a latch for retaining said support in raised position, means for releasing said latch, means for moving said clamping devices into engagement with the ends of the box, and means co-active with the latch for locking the clamping devices in their engaged position.

32. The combination with a frame, of arms pivoted to said frame, clamping devices rotatably mounted upon said arm, a toggle connecting said arms, means for actuating said toggle to cause said clamping devices to engage the ends of a box, a box support having a link connection with said frame and adapted to move downwardly and rearwardly, a latch for retaining said box support in raised position, means for controlling said latch, and means controlled by said latch for locking said clamping devices in engagement with the ends of the box.

33. The combination with a frame, of a box support, uprights fixed to the frame at each side, links having forwardly turned lower ends pivoted to said uprights and pivotally connected at their upper ends to said box support which is guided by said uprights and tends normally to move downwardly and rearwardly, a latch for retaining said box support in raised position, and a foot lever for causing the disengagement of said latch from the support to allow the same to move out of the way, and means for raising said box support.

34. The combination with a frame having rotatable clamping devices at each side thereof adapted to be moved into engagement with the ends of a box, of a box support below said clamping devices and movable away from the box, means for releasing said box support, means for actuating said clamping devices to cause the same to engage the ends of the box, and a connection between said last-named means and the box support for raising the latter into position against the bottom of the box.

35. The combination with a frame, of a pair of arms pivoted to said frame, rotatable clamping devices having teeth adapted to engage the ends of a box and mounted upon the forward ends of said arms, a box support, uprights fixed to the frame at each side, links having forwardly turned lower ends pivoted to said uprights and pivotally connected at their upper ends to said box support which is guided by said uprights and tends normally to move downwardly and rearwardly, a toggle connecting the rear ends of said arms, a slotted slide connected at one end to the intermediate pivot of said toggle, a hand lever pivoted intermediate its ends to the opposite end of said slotted slide whereby, upon the actuation thereof, said clamping devices will be moved into engagement with the ends of said box, a latch for retaining said box support in raised position, a detent for retaining said clamping devices in engagement with the ends of the box, and a foot lever for causing the disengagement of said latch from the support to allow the same to move out of the way and to move said detent into engagement with said slide to retain the box in clamped position, and a connection between said hand lever and said box support for raising the same.

36. The combination with a frame, of a pair of arms pivoted to the frame and provided at their front ends with rotatable devices for engaging the ends of a box to rotatably support the same, a toggle connecting the opposite ends of the arms, a slotted slide for actuating said toggle, a box support movable rearwardly and downwardly from the bottom of said box, a latch engaging said support and adapted to be raised therefrom to disengage the same to allow it to fall, a vertically movable detent pivotally attached to the end of the latch remote from the box support and adapted to be moved into engagement with the slide to lock the same, a foot lever, a link connecting said foot lever with said latch at a point adjacent said detent, whereby when said box support is in lowered position, said latch will retain the detent in raised position, locking the slide, and a lever for actuating said slide and for raising said box support.

37. The combination with a frame, rotatable clamping devices mounted thereon and adapted to engage the ends of a box, a box support movable rearwardly and downwardly from the bottom of said box, a latch engaging said support for retaining it in raised position, a detent for retaining said clamping device in engagement with the ends of the box, a lever for raising said box support, a foot lever, and means connecting said foot lever with the latch.

38. The combination with a frame, of arms pivoted to said frame, rotatable clamping devices mounted upon said arms, a toggle connecting said arms for actuating the same to cause the clamping devices to engage the ends of a box, a movable box support adapted to move downwardly and rearwardly and mounted upon said frame below said clamping devices, a slotted slide connected at one end to the central pivot of said toggle, a lever pivoted intermediate its ends to the opposite end of said slide, a link connection between the lower end of said lever and said support, a longitudinally extending latch for retaining said box support in raised position and provided with a notch at its forward end and adapted to engage and rest upon the box support, a vertically extending detent pivoted at its lower end to the rear end of said latch and adapted to be moved upwardly into the slot of said slide to lock the same against movement, means for limiting the upward movement of said detent, a lever for releasing said latch, and a link connecting one end of said last-mentioned lever with the end of said latch adjacent said detent whereby when said last-mentioned lever is actuated the detent will be first raised to lock the clamping devices in position and then the forward end of the latch will be raised to release the support.

39. The combination with a frame, of adjustable rotatable clamping devices, means for adjusting said clamping devices, a movable box support, a latch adapted to engage the support to retain the same in raised position, said frame being provided with openings, a vertically arranged detent slidably mounted in said openings, adapted to be moved into engagement with the means for adjusting said clamping devices and pivotally connected to the end of the latch remote from the box support, means for limiting the upward and downward movement of said detent, an actuating lever for said latch, a link connecting said lever with the end of said latch adjacent the detent whereby the clamping devices are first locked, and then the forward end of the latch raised to release the support, the release of the lever allowing the forward end of the latch to fall to hold the detent in raised position to lock the clamping devices.

40. The combination with a frame, of clamping devices rotatably and adjustably mounted upon said frame, a box support movable downwardly and rearwardly, means for actuating said clamping devices to move the same into engagement with said box, a latch mounted to the rear of said box support and provided at its forward end with a notch engaging the top of the support, said frame being provided with openings, a detent slidably mounted within said openings and arranged to be moved upwardly into engagement with the means for actuating said clamping devices and pivotally connected at its lower end to the end of said latch remote from the box support, means for limiting the upward movement of said detent, a lever, a link connection between one end of said lever and the end of said latch adjacent the detent, and a connection between the means for actuating the clamping devices and said box support for raising the support which in turn raises the latch.

41. The combination with a frame comprising side members adjustable toward each other, of an arm pivoted to each of said side members, rotatable clamping devices journaled in the forward ends of said arms, a toggle connecting the rear ends of said arms, and means for actuating said toggle, said toggle being adjustable so that the length thereof may be varied in accordance with the adjustment of the side members.

42. The combination with a frame comprising side members adjustable toward each other, of an arm pivoted to each of said side members, rotatable clamping devices journaled in the forward ends of said arms, means for connecting said arms, said means being adjustable so that the length thereof may be varied in accordance with the adjustment of the side members.

43. The combination with side frames, and transverse members adjustably connecting the same, of separate clamping devices for each end of a box mounted on each side frame, and common means for simultaneously moving said devices, said means being supported by said transverse members and adjustable to accord with the adjustment of said frames.

44. The combination with side frames, and transverse members adjustably connecting the same, of separate clamping devices for each end of a box mounted on each side frame, means for moving said clamping devices into and out of engagement with the box, said means being adjustable to accord with the adjustment of the side frames, a movable box support supported and guided by said side frames, and means for adjusting the box support laterally to accord with the adjustment of the side frames.

45. The combination with side frames, and transverse members connecting the same, said members being adjustable, of clamping devices for each end of a box mounted on each side frame, means for moving said devices into and out of engagement with the box, and a movable box support comprising longitudinally extending angle irons, the lower flanges of which constitute supporting ledges for the box, and means for adjustably connecting the inner or rear ends of the angle irons to accord with the adjustment of the side frames.

46. The combination with a frame, of clamping devices rotatably and adjustably mounted upon said frame, means for controlling said clamping devices to move the same into engagement with the ends of a box, a box support having a link connection with said frame and adjustable vertically, a latch for retaining said box support in raised position, a lever for actuating said latch, a link connecting said lever and latch and adjustable with relation to one of them, a detent having adjustable pivotal connection with one end of said latch and movable into engagement with the actuating means for said clamping device to lock the same, and an adjustable connection between said actuating means and the box support.

47. The combination with side frames and transverse members connecting the same, said members being adjustable to vary the width of the space between the frames, of a longitudinal arm supported on each side frame and pivoted to the same so as to swing in a horizontal plane, clamping devices for the ends of a box mounted on one end of each arm, and means for moving the arms to engage or disengage the said devices with the box, said means being supported by said transverse members.

48. The combination with side frames, and transverse members connecting the same, said members being adjustable to vary the width of the space between the frames, clamping devices for the end of a box mounted on the frames, guides attached to each side frame, a box support movably connected to each guide and movable vertically and rearwardly, said box support being formed of longitudinally extending angle irons spaced apart throughout their lengths, means for connecting the inner or rear ends of said angle irons, said means being adjustable to accord with the adjustment of said frames.

49. The combination with side frames and transverse members connecting the same, said members being adjustable to vary the width of the space between the frame, a longitudinally extending arm for the opposite ends of a box mounted on each side frame, clamping devices on the ends of each arm, independent supporting brackets mounted on each side frame to receive rolls of binding material, and independent tensioning devices for the said material also supported by said brackets, said brackets being disposed between said arms.

50. The combination with a frame, of a box support on which a box is placed, clamping devices for clamping the ends of the box while on said support, horizontally swinging supports for the clamping devices, means for moving the table out of the way to allow the rotation of the box, means for applying a binding element to said box as it is rotated, means for releasing the table and holding the box in clamped position, means for raising the box support to its normal position after the binding operation has been completed, a lever having toggle connection with the supports for the clamping devices to move the same into and out of engagement with the box, and foot operated means for locking the toggle against movement and also for locking the box support in normal position.

In testimony that I claim the foregoing as my own I have hereto affixed my signature in the presence of two witnesses.

THOMAS R. WATSON.

Witnesses:
C. CHRISTENSEN,
M. JORDAN.

Copies of this patent may be obtained for five cents each, by addressing the "Commissioner of Patents, Washington, D. C."